United States Patent
Korneev

(10) Patent No.: US 10,108,815 B2
(45) Date of Patent: Oct. 23, 2018

(54) ELECTRONIC DOCUMENT CONTENT REDACTION

(71) Applicant: ABBYY Development LLC, Moscow (RU)

(72) Inventor: Ivan Yurievich Korneev, Moscow (RU)

(73) Assignee: ABBYY Development LLC, Moscow (RU)

( * ) Notice: Subject to any disclaimer, the term of this patent is extended or adjusted under 35 U.S.C. 154(b) by 584 days.

(21) Appl. No.: 14/508,560

(22) Filed: Oct. 7, 2014

(65) Prior Publication Data

US 2015/0378973 A1    Dec. 31, 2015

(30) Foreign Application Priority Data

Jun. 24, 2014    (RU) ................ 2014125500

(51) Int. Cl.
  *G06F 17/22*    (2006.01)
  *G06F 21/62*    (2013.01)
  *G06F 17/21*    (2006.01)

(52) U.S. Cl.
  CPC ........ *G06F 21/6245* (2013.01); *G06F 17/211* (2013.01)

(58) Field of Classification Search
  CPC .. G06F 21/6245; G06F 17/211; G06K 9/2054
  See application file for complete search history.

(56) References Cited

U.S. PATENT DOCUMENTS

| | | | | | |
|---|---|---|---|---|---|
| 5,581,682 | A * | 12/1996 | Anderson | ............. | G06F 17/241 715/236 |
| 7,428,701 | B1 * | 9/2008 | Gavin | ................... | G06F 17/241 715/243 |
| 7,536,635 | B2 * | 5/2009 | Racovolis | ............... | G06F 17/24 707/999.202 |
| 7,773,822 | B2 * | 8/2010 | Walker | ............. | G06F 17/30265 382/254 |
| 7,805,673 | B2 * | 9/2010 | der Quaeler | ............ | G06F 17/24 715/255 |
| 7,835,037 | B2 * | 11/2010 | Koide | .................. | G06K 9/2054 358/426.04 |
| 7,876,335 | B1 * | 1/2011 | Pittenger | ................. | G06F 17/21 345/619 |
| 8,181,261 | B2 * | 5/2012 | Sperry | ............... | G06F 21/6245 380/243 |
| 8,245,038 | B2 * | 8/2012 | Golle | ...................... | G06F 21/64 713/168 |

(Continued)

*Primary Examiner* — Maikhanh Nguyen
(74) *Attorney, Agent, or Firm* — Lowenstein Sandler LLP

(57) ABSTRACT

Systems and methods for redacting certain content (e.g., content representing private, privileged, confidential, or otherwise sensitive information) from electronic documents. An example method comprises: identifying, by a computing device, two or more layers in an electronic document; processing each of the identified layers to produce a layer text representing one or more objects comprised by the layer; combining the produced layer texts to produce a combined text of the electronic document; and identifying, within the combined text of the electronic document, a target character string corresponding, in view of a specified search function, to a specified character string.

10 Claims, 10 Drawing Sheets

(56) References Cited

U.S. PATENT DOCUMENTS

| | | | |
|---|---|---|---|
| 8,456,654 B2* | 6/2013 | Kelly | G06T 11/60 358/1.13 |
| 8,494,280 B2* | 7/2013 | Nagarajan | G06K 9/2054 345/589 |
| 9,141,594 B2* | 9/2015 | Pittenger | G06F 17/21 |
| 9,436,882 B2* | 9/2016 | Dahl | G06K 9/00442 |
| 9,805,010 B2* | 10/2017 | Pittenger | G06F 17/24 |
| 2006/0242558 A1* | 10/2006 | Racovolis | G06F 17/241 715/205 |
| 2007/0030528 A1* | 2/2007 | Quaeler | G06F 17/30634 358/453 |
| 2007/0094594 A1* | 4/2007 | Matichuk | G06F 17/274 715/205 |
| 2007/0174766 A1 | 7/2007 | Rubin et al. | |
| 2007/0253620 A1* | 11/2007 | Nagarajan | G06K 9/2054 382/164 |
| 2008/0204788 A1* | 8/2008 | Kelly | G06T 11/60 358/1.15 |
| 2009/0019379 A1* | 1/2009 | Pendergast | G06F 17/30011 715/762 |
| 2009/0089663 A1* | 4/2009 | Rebstock | G06F 17/24 715/253 |
| 2009/0164881 A1* | 6/2009 | Segarra | G06F 21/6245 715/230 |
| 2009/0323087 A1* | 12/2009 | Luo | G06F 17/2288 358/1.9 |
| 2010/0046015 A1 | 2/2010 | Whittle et al. | |
| 2013/0144901 A1* | 6/2013 | Ho | G06F 17/30554 707/769 |
| 2014/0033029 A1* | 1/2014 | Pittenger | G06F 17/24 715/271 |
| 2014/0053232 A1 | 2/2014 | Coles et al. | |
| 2014/0212040 A1* | 7/2014 | Walker | G06K 9/2081 382/182 |
| 2014/0304594 A1* | 10/2014 | Pittenger | G06F 17/24 715/243 |
| 2015/0071542 A1* | 3/2015 | Dahl | G06K 9/00852 382/177 |

* cited by examiner

ELECTRONIC DOCUMENT CONTENT REDACTION

CROSS REFERENCE TO RELATED APPLICATIONS

This application claims the benefit of priority under 35 USC 119 to Russian Patent Application No. 2014125500, filed Jun. 25, 2014; the disclosure of which is incorporated herein by reference.

TECHNICAL FIELD

The present disclosure is generally related to computing devices, and is more specifically related to systems and methods for processing of electronic documents.

BACKGROUND

Electronic document content redaction may be utilized to allow selective disclosure of information contained in the document by producing a redacted version of the document which may be suitable for distribution to parties which may differ from the intended audience of the original document. For example, before distributing or publishing an electronic document, the document author may want to remove therefrom some private, privileged, confidential, or otherwise sensitive information, such as, e.g., personal or business names, identifiers, addresses, phone numbers, etc.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
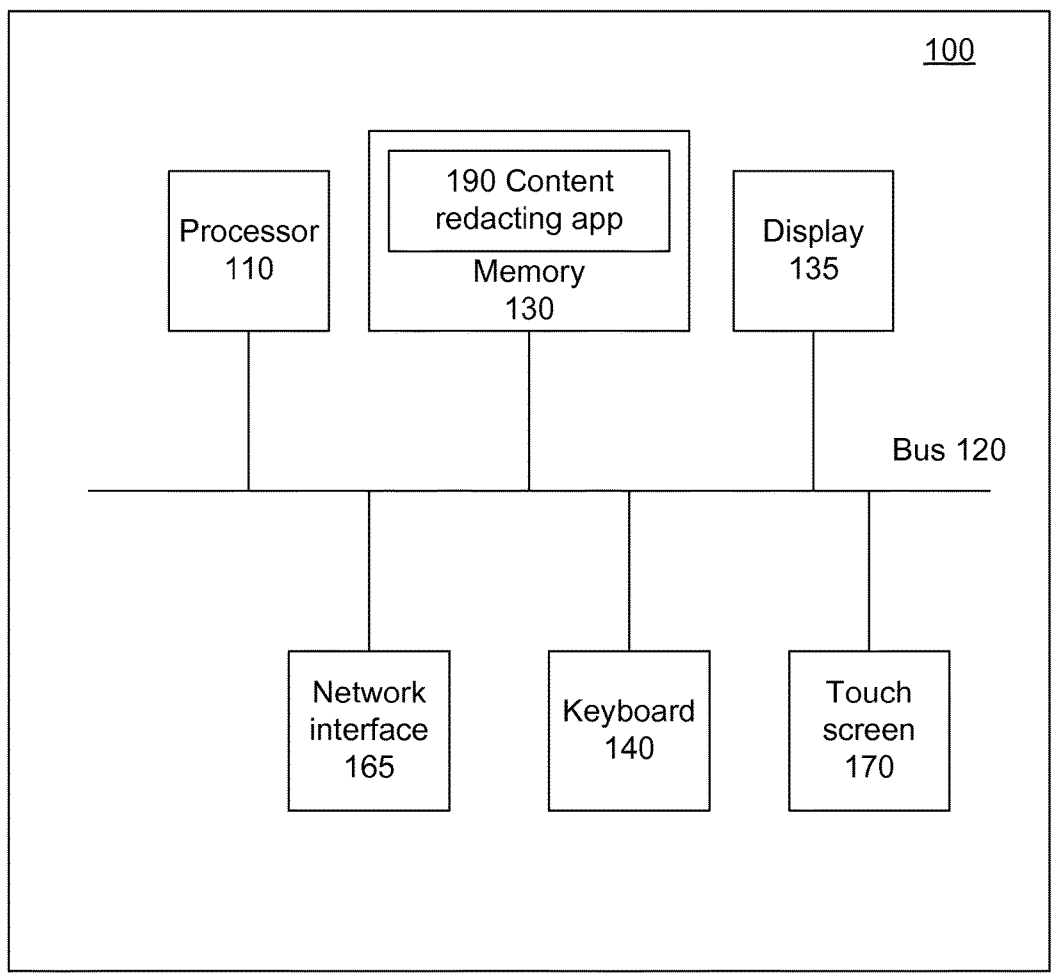
FIG. 1 depicts a block diagram of one embodiment of a computing device operating in accordance with one or more aspects of the present disclosure.

Described herein are methods and systems for processing electronic documents by computing devices to redact certain content (e.g., private, privileged, confidential, or otherwise sensitive information).

"Electronic document" herein shall refer to a file comprising one or more digital content items that may be visually rendered to provide a visual representation of the electronic document (e.g., on a display or a printed material). In various illustrative examples, electronic documents may conform to certain file formats, such as PDF, DOC, ODT, etc.

"Computing device" herein shall refer to a data processing device having a general purpose processor, a memory, and at least one communication interface. Examples of computing devices that may employ the methods described herein include, without limitation, desktop computers, notebook computers, tablet computers, smart phones, and various other mobile and stationary computing devices.

Before distributing or publishing an electronic document, the document author may want to remove therefrom some private, privileged, confidential, or otherwise sensitive information, such as, e.g., personal or business names, identifiers, addresses, phone numbers, etc. In an illustrative example, a content redacting application may receive an input specifying a character string to be redacted from an electronic document. Responsive to receiving the character string, the content redacting application may process the electronic document to identify all occurrences of character strings corresponding to the user-specified character string in view of a certain search function (e.g., a strict search, a fuzzy search, a synonymic search, a morphologically-aware search, a semantic search, or a search employing a user-defined transformation). One or more character strings corresponding to the user-specified character string in view of a specific search function are referred herein as "target character strings".

However, various common implementations of content redacting applications may fail to identify the occurrences of target character strings, if such a string comprises two or more parts belonging to different document layers. For example, an electronic document may comprise two or more layers including a first layer containing an image of an initial corresponding to the first character of a target character string and a second layer containing the remaining characters of target character string. "Initial" herein shall refer to a character at the beginning of a portion of text (e.g., a paragraph) that is larger than the rest of the text and may be ornately decorated.

The present disclosure addresses the above noted and other deficiencies by searching the target character strings in a combined text produced by combining two or more document layers, as described in more details herein above. Various aspects of the above referenced methods and systems are described in details herein below by way of examples, rather than by way of limitation.

FIG. 1 depicts a block diagram of one illustrative example of a computing device 100 operating in accordance with one or more aspects of the present disclosure. In illustrative examples, computing device 100 may be provided by various computing devices including a tablet computer, a smart phone, a notebook computer, or a desktop computer.

Computing device 100 may comprise a processor 110 coupled to a system bus 120. Other devices coupled to system bus 120 may include memory 130, display 135 equipped with a touch screen input device 170, keyboard 140, and one or more communication interfaces 165. The term "coupled" herein shall include both electrically connected and communicatively coupled via one or more interface devices, adapters and the like.

Processor 110 may be provided by one or more processing devices including general purpose and/or specialized processors. Memory 130 may comprise one or more volatile memory devices (for example, RAM chips), one or more non-volatile memory devices (for example, ROM or EEPROM chips), and/or one or more storage memory devices (for example, optical or magnetic disks).

In certain implementations, computing device 100 may comprise a touch screen input device 170 represented by a touch-sensitive input area and/or presence-sensitive surface overlaid over display 135. An example of a computing device implementing aspects of the present disclosure will be discussed in more detail below with reference to FIG. 9.

In certain implementations, memory 130 may store instructions of an application 190 for redacting certain content (e.g., private, privileged, confidential, or otherwise sensitive information) from electronic documents. In an illustrative example, content redacting application 190 may be implemented as a function to be invoked via a user interface of another application (e.g., an electronic document editing application). Alternatively, content redacting application 190 may be implemented as a standalone application.

In an illustrative example, content redacting application 190 may receive an input specifying a certain character string to be redacted from an electronic document. The user-specified character string may comprise one or more characters representing one or more morphemes (e.g., words) of a natural language, one or more acronyms, one or more arbitrarily constructed alphanumeric sequences, etc. In various illustrative examples, the user-specified character string may represent private, privileged, confidential, or otherwise sensitive information, such as, e.g., personal or business names, identifiers (e.g., social security numbers, credit card numbers, etc.), addresses, phone numbers, etc.

Responsive to receiving the user-specified character string, application 190 may process the electronic document to identify all occurrences of target character strings corresponding, in view of a specified search function, to the user-specified character string to be redacted from the document. For clarity and conciseness of the present disclosure, the below description and examples assume that the strict search is used, and hence the target character string matches the user-specified character string to be redacted from the electronic document. However, the systems and methods disclosed may also employ other types of text searches, including but not limited to a fuzzy search, a synonymic search, a morphologically-aware search, a semantic search, or a search using a user-defined transformation, as described in more details herein below. One or more character strings corresponding to the user-specified character string in view of a specific search function are referred herein as "target character strings".

Application 190 may further remove, from the electronic document, all identified occurrences of target character strings. In certain implementations, application 190 may further replace each removed occurrence of a target character string with a certain substitute string comprising a sequence of white spaces or other pre-defined or configurable characters. In certain implementations, application 190 may further graphically indicate the position of each redacted occurrence of a target character string in the electronic documents, e.g., by blacking out the original position of the specified character string.

In certain implementations, content redacting application 190 may be designed to process electronic documents of certain formats (e.g., PDF, DOC, ODT, etc.). An electronic document may comprise objects associated with various data types, including text (e.g., a sequence of characters), images, annotations (e.g., editing remarks and/or comments), metadata (e.g., the document author, creation timestamp, last access timestamp, etc.), and/or embedded files. One or more object attributes may be associated with an object to define the position of the object within a group of objects and/or visual representation of the electronic document, the object visibility, and/or transparency.

As the content to be redacted may be comprised by a one or more objects associated with one or more of the above listed data types, content redacting application 190 may, in order to redact the target character string from an electronic document, process each of the objects comprised by the document, to identify all occurrences of target character strings corresponding, in view of the specified search function, to the user-specified character string to be redacted from the document. Each object or a group of objects (also referred to as a "layer") of an electronic document may be processed in view of the data type associated with the object or group of objects.

In an illustrative example, a textual object may comprise one or more character strings in one or more encodings (e.g., ASCII, UTF-8, etc.). Content redacting application 190 may search a textual object or group of objects for the occurrences of a target character string, in view of one or more text encodings utilized by a certain document format. In certain implementations, before performing the texts search, application 190 may pre-process the textual object or group of objects by performing automatic dictionary-based spell-checking, operator-assisted spell-checking, and/or automatic encoding validation.

In another illustrative example, an object may comprise one or more raster images (e.g., JPEG images). A raster image may be represented by a data structure comprising a plurality of bit groups encoding pixels of a visual representation of the object. In certain implementations, a raster image may optionally be compressed to exploit the spatial redundancy pertaining to the image. Content redacting application 190 may apply an optical character recognition (OCR) technique to the image, and then search the text produced by optical character recognition for the occurrences of the target character string. In certain implementations, application 190 may, before performing the texts search, pre-process the text by performing automatic dictionary-based spell-checking and/or operator-assisted spell-checking.

In another illustrative example, an object may comprise one or more vector images. A vector image may be represented by a plurality of geometrical primitives (e.g., points, lines, curves, shapes, and/or or polygons) defined by certain mathematical expressions. Content redacting application 190 may rasterize a vector image or a group of vector images and then process the resulting raster image as described herein above. In certain implementations, application 190 may, before rasterizing a vector image, pre-process the image by removing one or more image elements that are not relevant to the textual content (e.g., various frames, visual separators, etc.).

Certain electronic document formats may support grouping the objects in two or more layers. Each layer may comprise the layer metadata defining the position of the layer within a visual representation of the electronic document. In certain implementations, the layer metadata may further define the visibility and/or transparency of the layer objects.

An electronic document may comprise one or more visible and/or invisible layers. In an illustrative example, an electronic document produced by applying an OCR technique to an image of a printed page may include a visible layer comprising the page image and an invisible layer comprising the text produced by optical character recognition.

In certain implementations, content redacting application 190 may be designed to process various combinations of layers in order to detect occurrences of the target character strings that comprise two or more parts belonging to different layers. Such occurrences may only be produced by combining two or more layers, and hence may not be detected if each of the layers is processed independently of other layers.

Figure 2A:
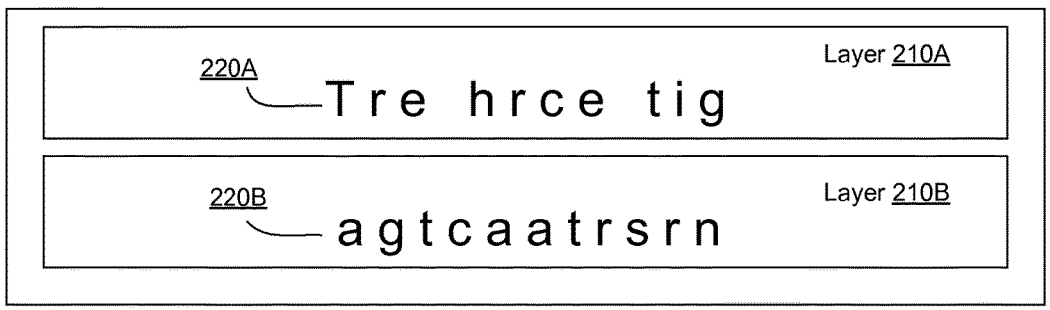
FIGS. 2A-2C illustrate examples of multi-layer electronic documents in which the target character string comprises of two or more parts belonging to different layers, in accordance with one or more aspects of the present disclosure.
Figure 2B:
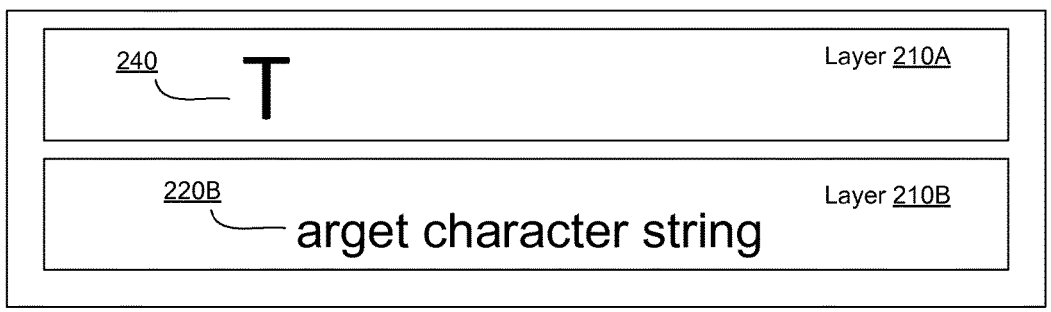
Figure 2C:
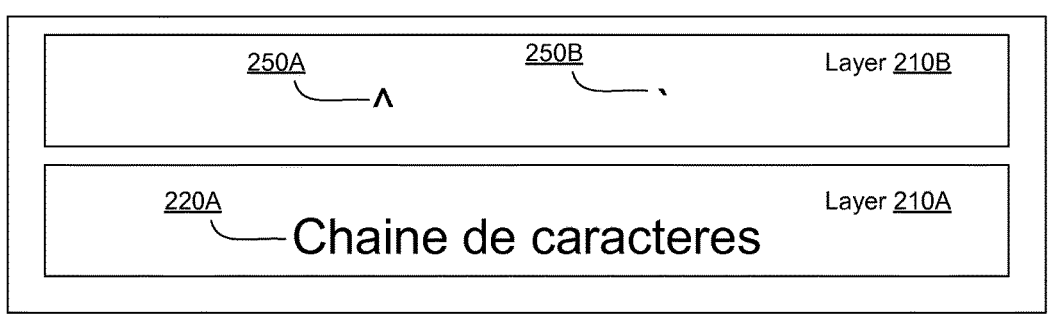

FIGS. 2A-2C illustrate examples of multi-layer electronic documents in which the target character string comprises two or more parts belonging to different layers. In the example of FIG. 2A, electronic document 200 comprises two layers 210A and 210B. Layer 210A contains a first subset 220A of characters of target character string 230 (e.g., the characters occupying odd positions within target character string 230), while layer 210B contains a second subset 220B of characters of target character string 230 (e.g., the characters occupying even positions within target character string 230. Each of layers 210A-210B comprises the layer metadata (not shown in FIG. 2A) describing the position of the respective layer within a visual representation of electronic document 200, such that character sequences 220A and 220B are mutually interposed within the visual representation, and hence their visual combination produces target character string ("Target character string") 230.

In the example of FIG. 2B, electronic document 200 comprises two layers 210A and 210B. Layer 210A contains an image of an initial 240 corresponding to the first character of target character string 230. Layer 210B contains a character sequence 220B comprising the remaining characters of target character string 230. Each of layers 210A-210B comprises the layer metadata (not shown in FIG. 2B) describing the position of the respective layer within a visual representation of electronic document 200, such that initial 240 and character sequence 220B are mutually interposed within the visual representation, and hence their visual combination produces target character string 230.

In the example of FIG. 2C, electronic document 200 comprises two layers 210A and 210B. Layer 210A contains a character sequence 220A comprising the characters of target character string 230. Layer 210B contains diacritic signs 250A, 250B associated with certain characters of target character string 230. Each of layers 210A-210B comprises the layer metadata describing the position of the respective layer within a visual representation of electronic document 200, such that character sequence 220A and diacritic signs 250 are mutually interposed within the visual representation, and hence their visual combination produces target character string 230.

The content redacting application operating in accordance with one or more aspects of the present disclosure may process various combinations of layers of an electronic document, in order to detect occurrences of the target character string that comprise two or more parts belonging to different layers.

Figure 3A:
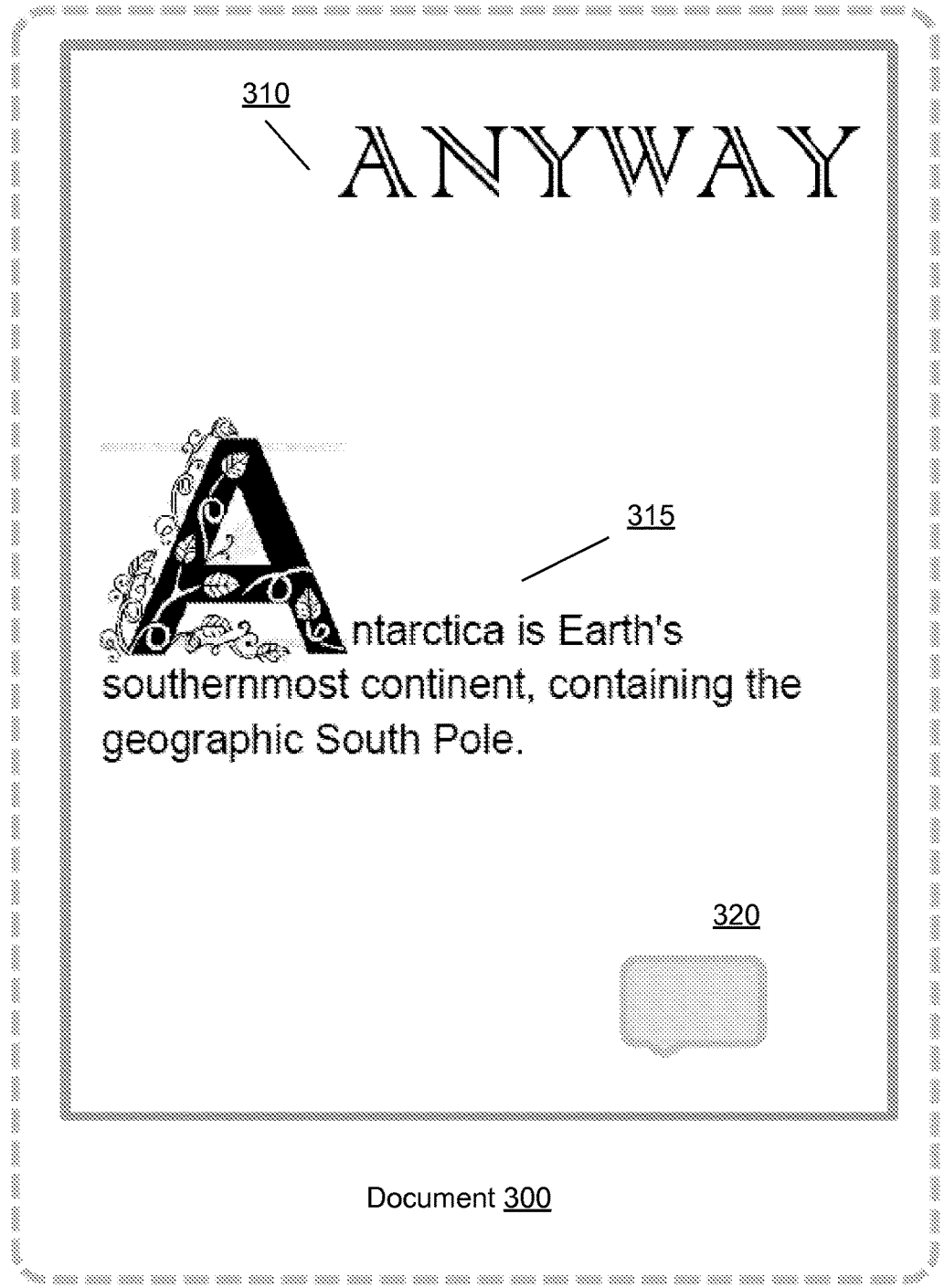
FIGS. 3A-3B schematically illustrates various representations of an electronic document being processed by a content redacting application operating in accordance with one or more aspects of the present disclosure.
Figure 3B:
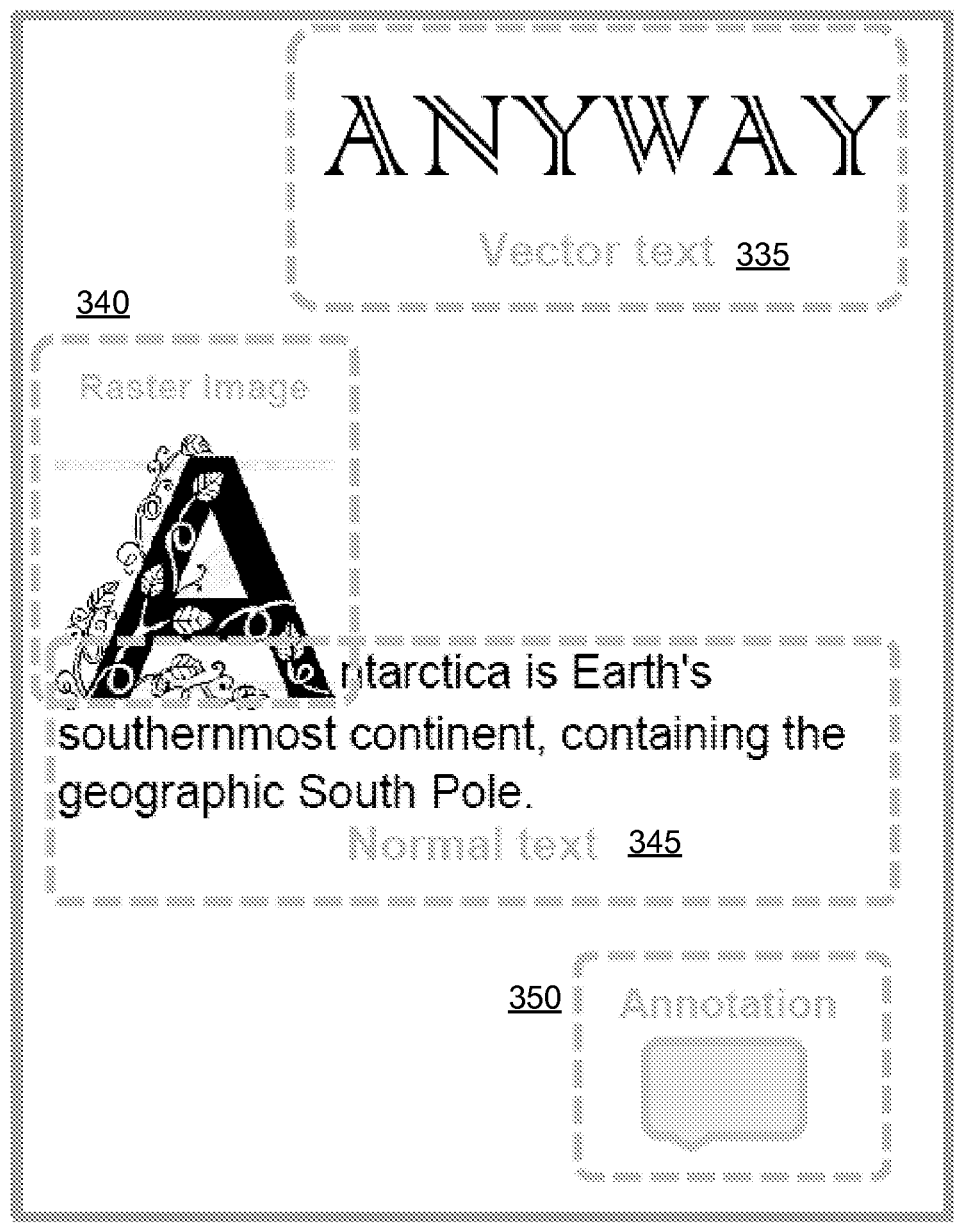

FIGS. 3A and 3B schematically illustrate various representations of an electronic document being processed by a content redacting application operating in accordance with one or more aspects of the present disclosure. FIG. 3A schematically illustrates a visual representation of an electronic document 300 comprising a logotype 310, a text paragraph 315 and an editorial annotation 320. As schematically illustrated by FIG. 3B, the content redacting application may identify, in the electronic document, a plurality of objects of one or more types (a vector image 335, a raster image 340, a text 345, and an annotation 350), that may be grouped into two or more layers. The content redacting application may then process each of the identified layers to produce layer texts corresponding to the respective layer.

Figure 4:
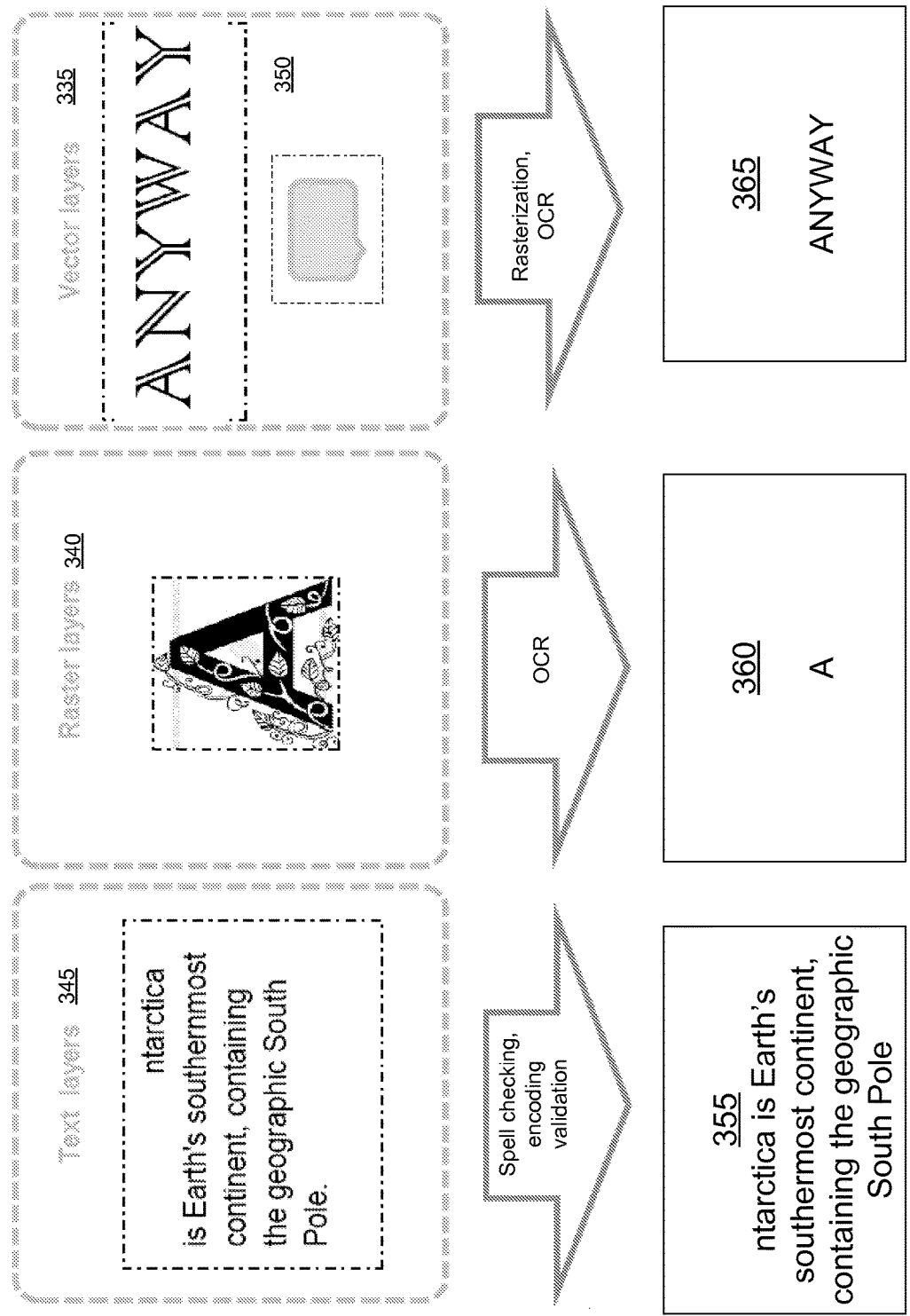
FIG. 4 schematically illustrates processing of various electronic document layers by the content redacting application operating in accordance with one or more aspects of the present disclosure.
Figure 5:
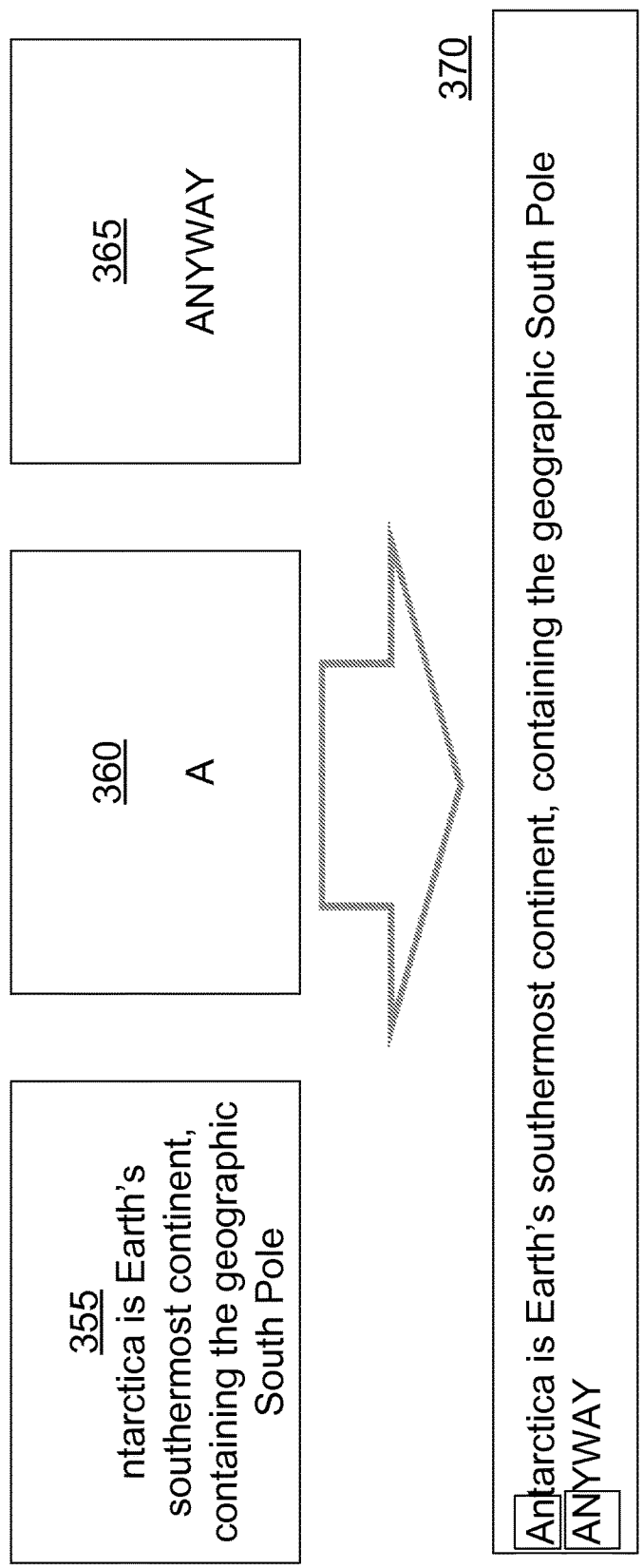
FIG. 5 schematically illustrates combining multiple layer texts to produce a combined text of the electronic document being processed by the content redacting application operating in accordance with one or more aspects of the present disclosure.

FIGS. 4 and 5 schematically illustrate processing of various electronic document layers by the content redacting application operating in accordance with one or more aspects of the present disclosure. Referring to FIG. 4, processing of each layer may be defined by the layer type. In an illustrative example, a text 355 corresponding to text layer 345 comprising one or more textual objects may be produced by combining one or more character strings contained within the layer. In certain implementations, the text may then be further processed by performing automatic dictionary-based spell-checking, operator-assisted spell-checking, and/or automatic encoding validation.

In another illustrative example, a text 360 corresponding to raster layer 340 comprising one or more raster images may be produced by performing optical character recognition of the raster images contained within layer 340.

In another illustrative example, a text 365 corresponding to vector layers 335 and 350 comprising one or more vector images may be produced by rasterizing the vector images contained within layers 335 and 350 and then performing optical character recognition of the resulting raster images. In certain implementations, the content redacting application may, before rasterizing a vector image, pre-process the image by removing one or more image elements that are not relevant to the textual content (e.g., various frames, visual separators, etc.).

Responsive to producing layer texts 355, 360, and 365 corresponding to each of the layers of the electronic document, the content redacting application may combine the produced layer texts to produce a combined text 370 of the electronic document, as schematically illustrated by FIG. 5. The content redacting application may search combined text 370 to identify one or more occurrences of the target character strings "An" to be redacted from the electronic document.

The content redacting application may identify all occurrences of character strings corresponding to the user-specified character string in view of a certain search function (e.g., a strict search, a fuzzy search, a synonymic search, a morphologically-aware search, a semantic search, or a search employing a user-defined transformation).

"Strict search" herein refers to identifying an exact occurrence of the user-specified string, using case-sensitive or case-insensitive search. "Fuzzy search" herein refers to identifying one or more strings that are similar, in view of a certain similarity metric, to the user-specified string (e.g., the user-specified string typed with an error may be identified by a fuzzy search). "Synonymic search" herein refers to identifying one or more character strings that represent synonymic language constructs with respect to the user-specified string. "Morphologically-aware search" herein refers to identifying various morphological forms of one or more lexemes comprised by the user-specified character string (e.g., both singular and plural forms of a noun comprised by the user-specified character string; various forms of a verb comprised by the user-specified character string, etc.). "Semantic search" herein shall refer to identifying one or more character strings that represent language constructs which are semantically similar to the user-specified string. "Search employing a user-defined transformation" herein shall refer to identifying one or more character strings that are similar, in view of the user-defined transformation, to the user-specified string. An example of a user-defined transformation may comprise a lexeme translation dictionary (e.g., a language-to-language translation dictionary).

One or more character strings corresponding to the user-specified character string in view of a specific search function are referred herein as "target character strings".

Figure 6A:
FIGS. 6A-6B schematically illustrate redacting identified occurrences of the specified character string from the electronic document being processed by the content redacting application operating in accordance with one or more aspects of the present disclosure.
Figure 6B:
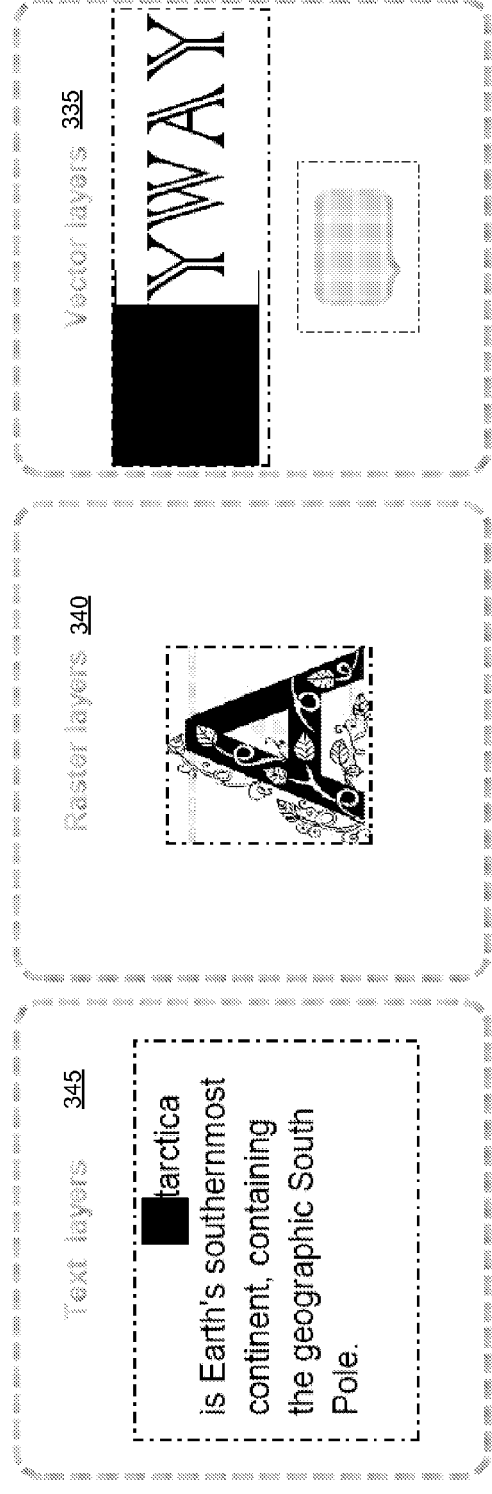

Responsive to identifying one or more occurrences of one or more target character strings in the combined text of the electronic document, the content redacting application may project the search results onto the original layers, by identifying the textual or graphical objects representing the identified target character string occurrences. FIGS. 6A-6B schematically illustrate redacting identified occurrences of the specified character string from the electronic document being processed by the content redacting application operating in accordance with one or more aspects of the present disclosure. Referring to FIG. 6A, an occurrence of the target character string "An" is represented by a combination of layers 345 and 340, and by layer 335.

Figure 7:
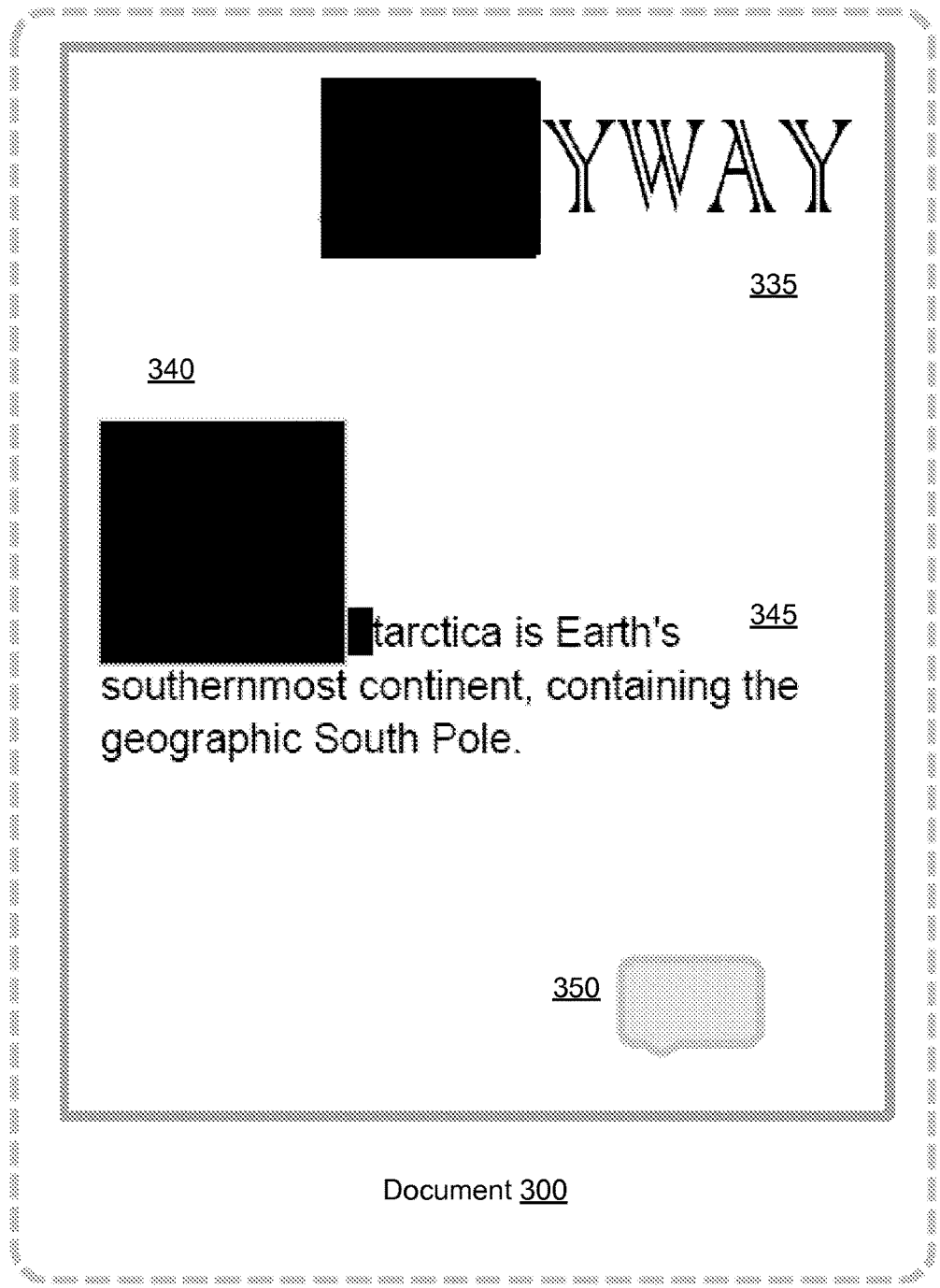
FIG. 7 schematically illustrates visually rendering the electronic document with redacted content by the content redacting application operating in accordance with one or more aspects of the present disclosure.

In certain implementations, the content redacting application may visually render the electronic document (e.g., on a display) and visually identify the content to be redacted (e.g. highlight) and prompt the user to confirm the content redaction. The content redacting application may then remove, from the electronic document, all identified occurrences of the specified character string. In certain implementations, application 190 may further replace each removed occurrence of the specified character string with a certain substitute string comprising a sequence of white spaces or other pre-defined or configurable characters. In certain implementations, the content redacting application may further graphically indicate the position of each redacted occurrence of the specified character string in the electronic documents, e.g., by blacking out the original position of the specified character string, as schematically represented by FIG. 6B and by FIG. 7.

In certain implementations, the content redacting application may further parse one or more metadata items to identify and redact possible occurrences of the target character string in the metadata of the electronic document. The content redacting application may further process one or more invisible layers of the electronic document to identify and redact possible occurrences of the target character string.

Figure 8:
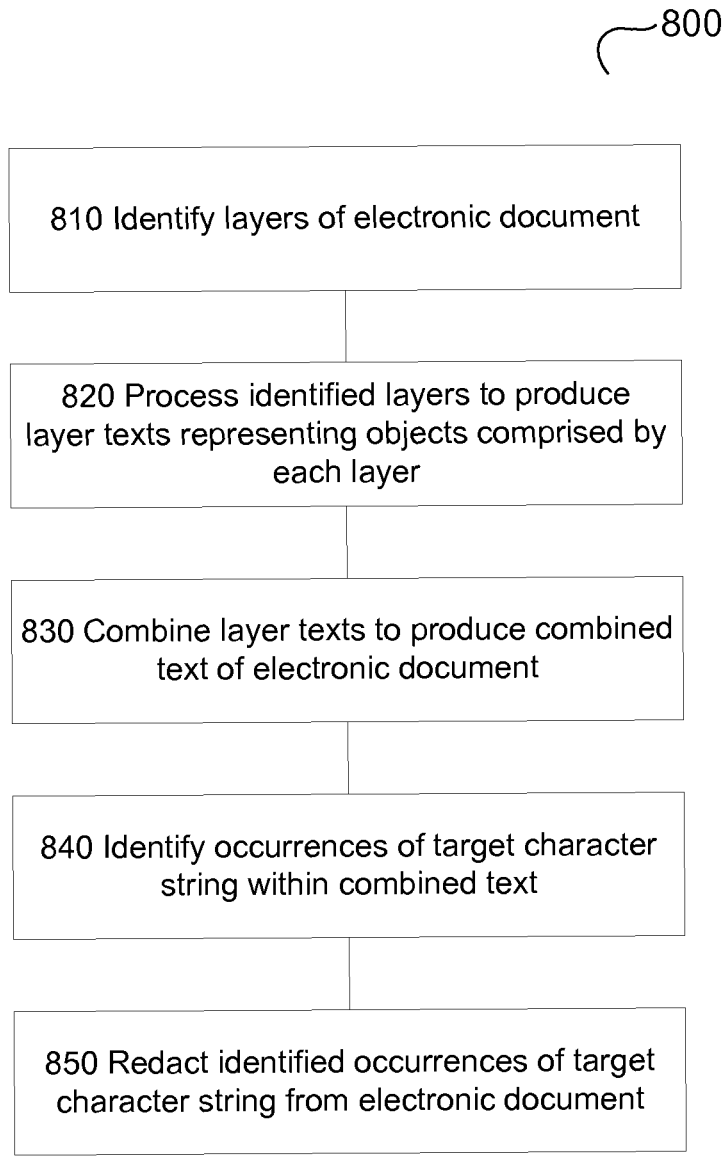
FIG. 8 depicts a flow diagram of an illustrative example of a method for redacting certain content from electronic documents, in accordance with one or more aspects of the present disclosure.

FIG. 8 depicts a flow diagram of one illustrative example of a method 800 for redacting certain content (e.g., content representing private, privileged, confidential, or otherwise sensitive information) from electronic documents, in accordance with one or more aspects of the present disclosure. Method 800 and/or each of its individual functions, routines, subroutines, or operations may be performed by one or more processors of the computer device (e.g., computing device 100 of FIG. 1) executing the method. In certain implementations, method 800 may be performed by a single processing thread. Alternatively, method 800 may be performed by two or more processing threads, each thread executing one or more individual functions, routines, subroutines, or operations of the method. In an illustrative example, the processing threads implementing method 800 may be synchronized (e.g., using semaphores, critical sections, and/or other thread synchronization mechanisms). Alternatively, the processing threads implementing method 800 may be executed asynchronously with respect to each other.

At block 810, the computing device performing the method may identify two or more layers in an electronic document. In an illustrative example, the computing device may analyze the document metadata to identify the plurality of layers comprised by the electronic document.

In certain implementations, the computing device may combine all the identified document text and non-text layers, to subdivide the electronic document into two layers: a textual layer and an image layer. The resulting two layers would comprise the visible document information (textual information and images). Various objects that do not belong to any layers (e.g., comments, metadata, and/or embedded files) may be removed from the resulting electronic document responsive to receiving a user interface command.

At block 820, the computing device may process each of the identified layers to produce a layer text representing one or more objects comprised by the layer. In an illustrative example, a text corresponding to a text layer comprising one or more textual objects may be produced by combining one or more character strings contained within the layer. In certain implementations, the text layer may then be further processed by performing automatic dictionary-based spell-checking, operator-assisted spell-checking, and/or automatic encoding validation. In another illustrative example, a text corresponding to a raster or vector layer comprising one or more graphical images may be produced by performing optical character recognition of the graphical images contained within the layer, as described in more details herein above.

At block 830, the computing device may combine the produced layer texts to produce a combined text of the electronic document which will be searched for occurrences of the target character string.

At block 840, the computing device may identify, within the combined text of the electronic document, one or more occurrences of the target character string.

At block 850, the computing device may remove, from the electronic document, the identified occurrences of the target character string, as described in more details herein above. In certain implementations, the computing device may further replace each removed occurrence of the specified character string with a certain substitute string comprising a sequence of white spaces or other pre-defined or configurable characters. The computing device may further graphically indicate the position of each redacted occurrence of the specified character string in the electronic documents, e.g., by blacking out the original position of the specified character string. Responsive to completing the operations that are described herein above with references to block 850, the method may terminate.

Figure 9:
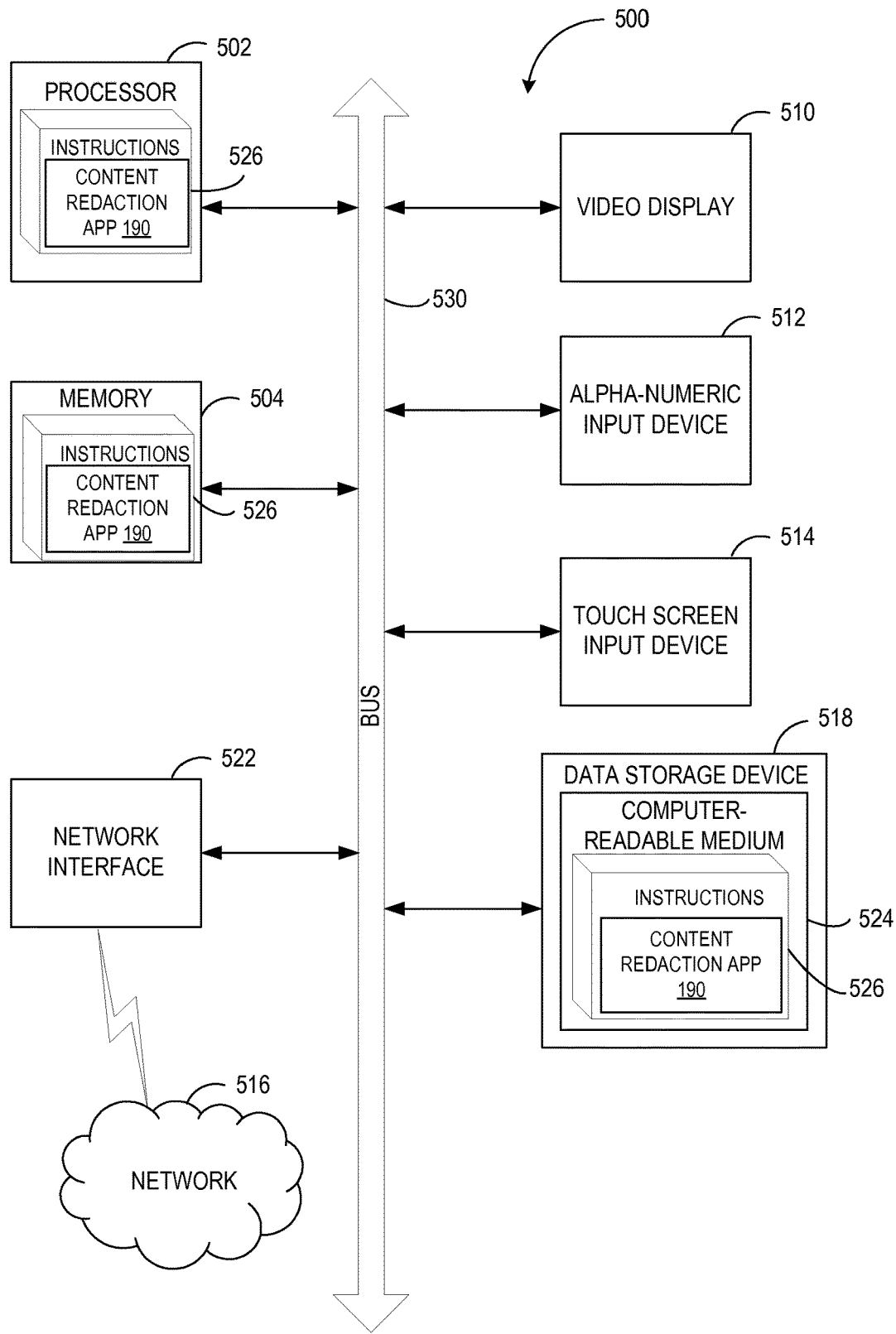
FIG. 9 depicts a more detailed diagram of an illustrative example of a computing device implementing the methods described herein.

FIG. 9 illustrates a more detailed diagram of an example computing device 500 within which a set of instructions, for causing the computing device to perform any one or more of the methods discussed herein, may be executed. The computing device 500 may include the same components as computing device 100 of FIG. 1, as well as some additional or different components, some of which may be optional and not necessary to provide aspects of the present disclosure. The computing device may be connected to other computing device in a LAN, an intranet, an extranet, or the Internet. The computing device may operate in the capacity of a server or a client computing device in client-server network environment, or as a peer computing device in a peer-to-peer (or distributed) network environment. The computing device may be a provided by a personal computer (PC), a tablet PC, a set-top box (STB), a Personal Digital Assistant (PDA), a cellular telephone, or any computing device capable of executing a set of instructions (sequential or otherwise) that specify operations to be performed by that computing device. Further, while only a single computing device is illustrated, the term "computing device" shall also be taken to include any collection of computing devices that individually or jointly execute a set (or multiple sets) of instructions to perform any one or more of the methodologies discussed herein.

Exemplary computing device 500 includes a processor 502, a main memory 504 (e.g., read-only memory (ROM) or dynamic random access memory (DRAM)), and a data storage device 518, which communicate with each other via a bus 530.

Processor 502 may be represented by one or more general-purpose processing devices such as a microprocessor, central processing unit, or the like. More particularly, processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute instructions 526 for performing the operations and functions discussed herein.

Computing device 500 may further include a network interface device 522, a video display unit 510, an character input device 512 (e.g., a keyboard), and a touch screen input device 514.

Data storage device 518 may include a computer-readable storage medium 524 on which is stored one or more sets of instructions 526 embodying any one or more of the methodologies or functions described herein. Instructions 526 may also reside, completely or at least partially, within main memory 504 and/or within processor 502 during execution thereof by computing device 500, main memory 504 and processor 502 also constituting computer-readable storage media. Instructions 526 may further be transmitted or received over network 516 via network interface device 522.

In certain implementations, instructions 526 may include instructions for a method of redacting certain content from electronic documents, which may correspond to method 800, and may be performed by application 190 of FIG. 1. While computer-readable storage medium 524 is shown in the example of FIG. 4 to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "computing", "calculating", "obtaining", "identifying," "modifying" or the like, refer to the actions and processes of a computing device, or similar electronic computing device, that manipulates and transforms data represented as physical (e.g., electronic) quantities within the computing device's registers and memories into other data similarly represented as physical quantities within the computing device memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Various other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
identifying, by a computing device, two or more layers in an electronic document;
processing a first layer of the identified layers, by performing optical character recognition of one or more images comprised by the first layer to produce a first layer text comprising one or more character strings representing respective images;
processing a second layer of the identified layers, to produce a second layer text;
combining the first layer text and the second layer text to produce a combined text of the electronic document;
identifying, within the combined text of the electronic document, a target character string corresponding, in view of a specified search function, to a specified character string;
redacting, from the electronic document, the target character string;
visually rendering the combined text of the electronic document; and
receiving an input confirming redaction of the target character string from the combined text of the electronic document.

2. The method of claim 1, wherein the specified search function is provided by one of: a strict search, a fuzzy search, a synonymic search, a morphologically-aware search, a semantic search, or a search employing a user-defined transformation.

3. The method of claim 1, wherein the redacting comprises at least one of: removing the target character string, replacing the target character with a filling string, or replacing an image corresponding to the target character string with a filling image.

4. The method of claim 1, wherein combining the first layer text and the second layer text is performed in view of relative positions of layer texts within a visual image of the electronic document.

5. The method of claim 1, wherein redacting the target character string comprises: redacting the target character string from one or more: a metadata item, an annotation field, or a comment field of the electronic document.

6. A computing device, comprising:
a memory;
a processor, coupled to the memory, to:
identify two or more layers in an electronic document;
process a first layer of the identified layers, by performing optical character recognition of one or more images comprised by the first layer to produce a first layer text comprising one or more character strings representing respective images;
process a second layer of the identified layers, to produce a second layer text;
combine the first layer text and the second layer text to produce a combined text of the electronic document;
identify, within the combined text of the electronic document, a target character string corresponding, in view of a specified search function, to a specified character string;
redact, from the electronic document, the target character string;
visually render the combined text of the electronic document; and
receive an input confirming redaction of the target character string from the combined text of the electronic document.

7. The computing device of claim 6, wherein the specified search function is provided by one of: a strict search, a fuzzy search, a synonymic search, a morphologically-aware search, a semantic search, or a search employing a user-defined transformation.

8. The computing device of claim 6, wherein combining the first layer text and the second layer text is performed in view of relative positions of layer texts within a visual image of the electronic document.

9. A computer-readable non-transitory storage medium comprising executable instructions that, when executed by a computing device, cause the computing device to perform operations comprising:
identifying two or more layers in an electronic document;
processing a first layer of the identified layers, by performing optical character recognition of one or more images comprised by the first layer to produce a first layer text comprising one or more character strings representing respective images;
processing a second layer of the identified layers, to produce a second layer text;
combining the first layer text and the second layer text to produce a combined text of the electronic document;
identifying, within the combined text of the electronic document, a target character string corresponding, in view of a specified search function, to a specified character string;
redacting, from the electronic document, the target character string;
visually rendering the combined text of the electronic document; and
receiving an input confirming redaction of the target character string from the combined text of the electronic document.

10. The computer-readable non-transitory storage medium of claim 9, wherein the specified search function is provided by one of: a strict search, a fuzzy search, a synonymic search, a morphologically-aware search, a semantic search, or a search employing a user-defined transformation.

* * * * *